(12) United States Patent
Carroll

(10) Patent No.: US 8,339,248 B2
(45) Date of Patent: Dec. 25, 2012

(54) AUTOMATED AUDIO OPERATION SUPPORT DEVICE AND METHODS

(76) Inventor: David W. Carroll, Grantsburg, WI (US)

( * ) Notice: Subject to any disclaimer, the term of this patent is extended or adjusted under 35 U.S.C. 154(b) by 787 days.

(21) Appl. No.: 12/110,927

(22) Filed: Apr. 28, 2008

(65) Prior Publication Data

US 2009/0115599 A1    May 7, 2009

Related U.S. Application Data

(60) Provisional application No. 60/914,610, filed on Apr. 27, 2007.

(51) Int. Cl.
*G08B 5/36* (2006.01)
(52) U.S. Cl. ......... 340/286.09; 340/539.11; 340/539.18; 340/5.2; 340/5.24; 340/5.62; 340/5.8; 340/7.58; 340/7.59
(58) Field of Classification Search ............ 340/539.11, 340/545.1, 679; 370/272, 352
See application file for complete search history.

(56) References Cited

U.S. PATENT DOCUMENTS

| | | | | |
|---|---|---|---|---|
| 4,162,449 A | * | 7/1979 | Bouyssounouse et al. ... | 455/521 |
| 5,321,848 A | * | 6/1994 | Miyahira et al. ............. | 455/66.1 |
| 5,590,407 A | * | 12/1996 | Ishikawa et al. ............. | 455/66.1 |
| 5,671,158 A | * | 9/1997 | Fournier et al. .................... | 345/8 |
| 5,751,260 A | * | 5/1998 | Nappi et al. ....................... | 345/8 |
| 5,864,481 A | * | 1/1999 | Gross et al. ...................... | 700/90 |
| 5,913,163 A | * | 6/1999 | Johansson .................. | 455/426.1 |
| 5,982,904 A | * | 11/1999 | Eghtesadi et al. ............... | 381/74 |
| 6,342,915 B1 | * | 1/2002 | Ozaki et al. ..................... | 348/61 |
| 6,406,811 B1 | * | 6/2002 | Hall et al. ....................... | 429/96 |
| 6,574,672 B1 | * | 6/2003 | Mitchell et al. ............... | 709/250 |
| 6,581,782 B2 | * | 6/2003 | Reed .............................. | 209/702 |
| 6,630,915 B1 | * | 10/2003 | Flood ................................ | 345/8 |
| 6,994,555 B2 | * | 2/2006 | Weiner et al. ................. | 434/236 |
| 7,110,963 B2 | * | 9/2006 | Negreiro ......................... | 705/15 |
| 7,609,669 B2 | * | 10/2009 | Sweeney et al. .............. | 370/328 |
| 7,885,419 B2 | * | 2/2011 | Wahl et al. ....................... | 381/74 |
| 2006/0132382 A1 | * | 6/2006 | Jannard .............................. | 345/8 |
| 2007/0080930 A1 | * | 4/2007 | Logan et al. .................. | 345/156 |
| 2007/0087319 A1 | * | 4/2007 | Roberts et al. ................ | 434/350 |
| 2008/0146292 A1 | * | 6/2008 | Gilmore et al. ............... | 455/572 |
| 2008/0159547 A1 | * | 7/2008 | Schuler et al. .................. | 381/56 |
| 2009/0318076 A1 | | 12/2009 | Awiszus | |

* cited by examiner

*Primary Examiner* — Daniel Wu
*Assistant Examiner* — Son M Tang
(74) *Attorney, Agent, or Firm* — Dicke, Billig & Czaja, PLLC

(57) ABSTRACT

A body-mounted electronic audio device playing prerecorded audio statements automatically issued as directed by wirelessly connected stationary computer decision-making using input from wearers and devices within the workplace environment to support to improve operational efficiency and effectiveness especially those in fast food stores.

20 Claims, 5 Drawing Sheets

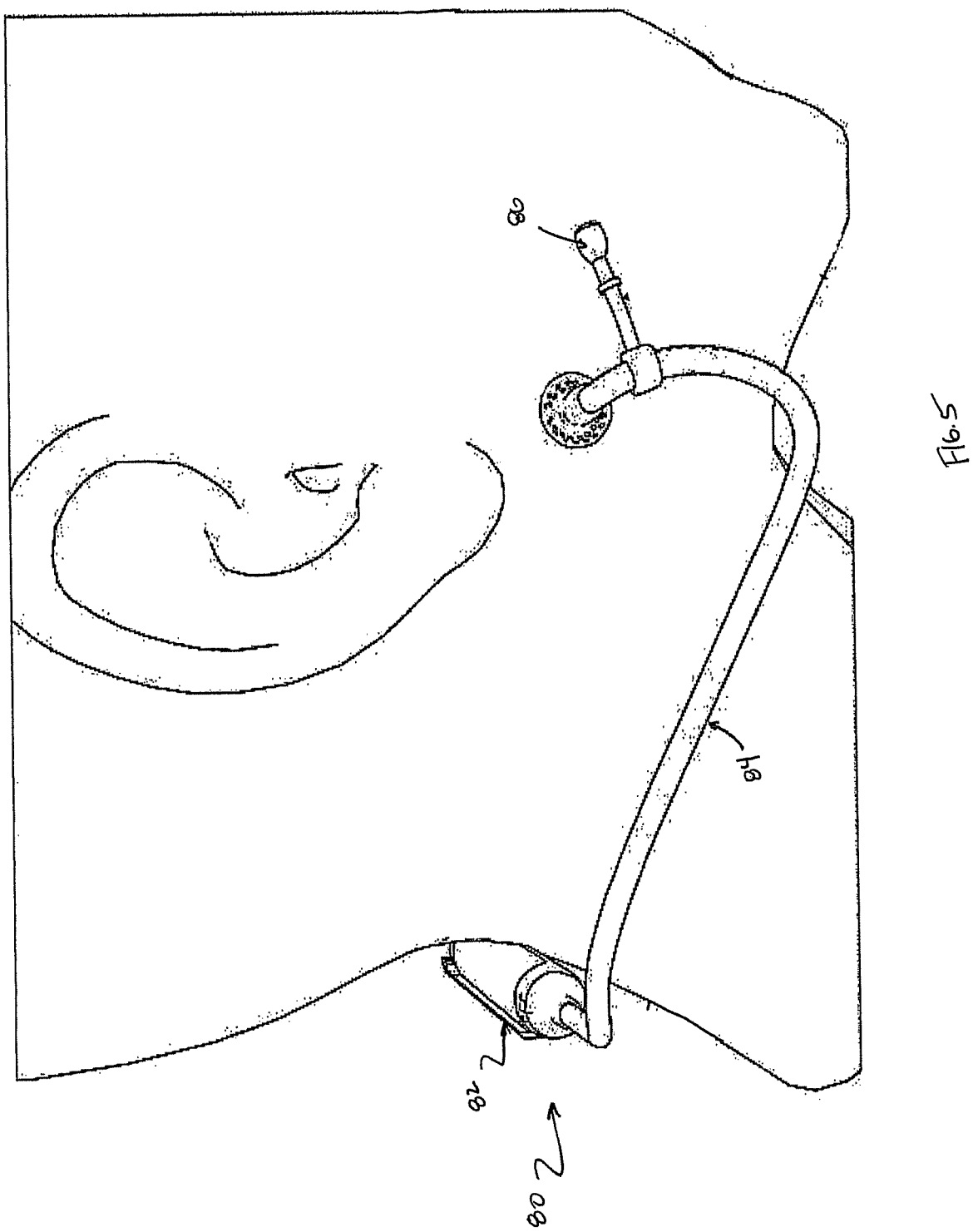

AUTOMATED AUDIO OPERATION SUPPORT DEVICE AND METHODS

CROSS-REFERENCE TO RELATED APPLICATIONS

This application claims priority under 35 U.S.C. §119(e)(1) to U.S. Provisional Patent Application Ser. No. 60/914,610, filed Apr. 27, 2007, entitled "Automated Audio Operation Support Device and Methods"; the entire teachings of which are incorporated herein by reference.

BACKGROUND

There are businesses that require exceptionally quick response to customer orders. Fast food operations are such a business and require immediate team effort to respond to customer requests. This places considerable pressure on the preparation/team system to communicate order knowledge and work cooperatively to achieve a changing mission while maintaining cleanliness and quality. Many fast food operations use headsets, fixed microphones for relaying orders by voice, or point-of-sale data driven displays to relay orders. Oftentimes orders are not heard, heard incorrectly or not seen quickly enough to respond acceptably to satisfy customers. Further, custom order requests can be missed. Crew members in these environments work as a team. One crew may begin cooking hamburger patties while a second assembles the last batch of cooked or 'held' patties into sandwiches and a third obtains a box of patties from a walk-in freezer. With increased customer traffic (e.g., a large group of students arrive after school or a bus stops for lunch), the coordination gets even more difficult. If one or more of the crew is new and in training, efficiency will lessen and quality, response times and customer satisfaction are jeopardized. Fast food employee retention is on average short so several crew may be in training at any given time.

Therefore there exists a need for improved devices and methods for providing better communication, coordination, training and crew response. These system support improvements need to be individualized, just in time and automated. It should validate activities such as facility and equipment cleaning, store opening/closing, staff coordination, response to point-of-sale (POS) orders, crew changes, and product delivery speeds. It should ease the burden of management due to crew turnover and reduce product risks from unqualified crew performance. Further, a need exists for a device and system to track and improve crew retention, productivity, quality and cleanliness. Such a system should do so without distracting from normal operations, crew interaction and customer experience. It should also provide management and store ownership with broader and more-timely information, recommendations and governance support.

SUMMARY

Aspects of the present disclosure address one or more or all of the above concerns. One aspect of the present disclosure relates to automatically providing operational support statements via a crew response system for improving custom Production facilities such as those found in a fast food restaurant. Statements are selected for play by a software program run on a PC or server. This computer monitors the store's operation and determines how best to manage, direct and support the Crew using pre-recorded statements. One version of the system design uses statements stored on a PC/server and broadcast individually to Crew receivers for audio play. Another version of the system is where the PC/server wirelessly sends a signal to the Crew device for statement selection and play from audio statements stored on the Crew device. In either case, the crew hear voiced messages on their body-mounted, wirelessly connected electronic audio device. The statements may be selected based on real-time and/or historic activities such as POS, restroom door and equipment sensors, crew performance and responses, etc. They may also be selected based on parameters set by store management, owners or corporate offsite operations personnel. In systems where statements are generated on the mobile device, custom statements can be installed when docked. Custom statements can be recorded and sent immediately or as desired on systems where PC/servers generate statements. Optionally this may be used to forward voice mail to mobile systems.

Another aspect of the system is a wireless response device. This may be integrated into the Crew mobile device audio player or as a separate send-only wireless device. In either case it permits the crew after hearing the statement to send a response or issue a request at anytime. A one-button response method can be employed where the number of presses within a designated time has different response meanings. A multiple button response method sends a code and meaning dedicated to each button. Combinations of the two methods are contemplated. In either case or using other input or send methods such as speech recognition or touch screens, the system provides two-way communication to verify message reception, understanding, task completion, message repetition, request or interact with training steps or other responses. The system may monitor POS sales, inventory, and Crew numbers, performance, location/assignment and experience. The Crew body-mounted device may play music between or behind the automated statements. This system may require a response before permitting the music to continue play or become acceptably loud. The music may be Crew selected and may become an incentive to improve attention and job retention.

BRIEF DESCRIPTION OF THE DRAWINGS

The accompanying drawings are included to provide a further understanding of the present disclosure and are incorporated in and constitute a part of this specification. The drawings illustrate some embodiments of the present disclosure and together with the description serve to explain the principles of the disclosure. Other embodiments of the present disclosure and many of the intended advantages of the present disclosure will be readily appreciated as they become better understood by reference to the following detailed description. The elements of the drawings are not necessarily to scale relative to each other.

FIG. 5 is a diagram and illustration of one embodiment of a body-mounted device with the remote speech recognition response button useful with the system of FIG. 1.

DETAILED DESCRIPTION

In the following Detailed Description, reference is made to accompanying figures and forms a part hereof, and in which is shown by way of illustration specific embodiments in which principles of the present disclosure may be practiced. It is to be understood that other embodiments may be utilized and structural or logical changes may be made without departing from the scope of the present disclosure. The following detailed description, therefore, is not to be taken in a limiting sense, and the scope of the present disclosure is defined by the appended claims.

Figure 1:
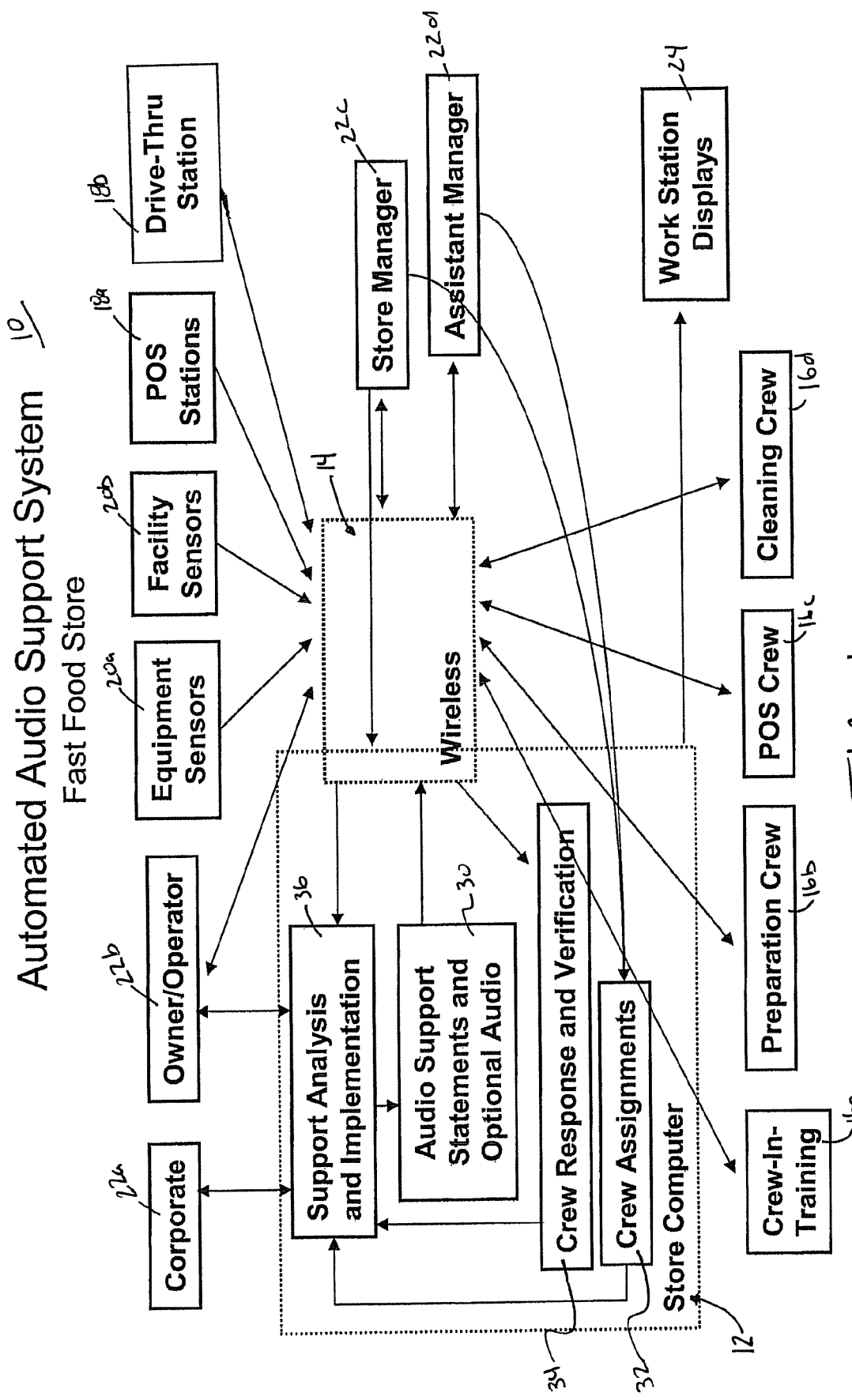
FIG. 1 is a diagram of one embodiment of an Automated Audio Support System of the present disclosure.

An automated audio support system 10 providing prerecorded statements to guide a worker (or "Crew") through activities is shown in FIG. 1. In general terms, the system 10 is ideally suited for a fast food operation work environment, and includes a base controller (e.g., personal computer or server) 12, a wireless transmitter/receiver or router 14, a plurality of portable body-mounted, automated audio support devices, and a plurality of body-mounted signaling devices. The automated audio devices and the signaling devices are not shown in FIG. 1, but are described in greater detail below. Generally, however, ones of the automated audio devices and signaling devices are provided to, and worn by, various crew members functioning in the work environment, with FIG. 1 reflecting possible crew members as including crew-in-training 16a, preparation crew 16b, point-of-sale crew 16c, and cleaning crew 16d. Depending upon the particular work environment implementation of the system 10, various other crew responsibilities can be designated. Regardless, the automated audio device and the signaling device worn by the individual crew member 16 are adapted to wirelessly communicate with the transmitter/receiver 14. The transmitter/receiver 14, in turn, wirelessly communicates with the computer 12, thereby facilitating delivery (or prompting of delivery) of statements, instructions, responses, etc., between the computer 12 and the various automated audio support devices and signaling devices.

The transmitter/receiver 14 can further facilitate wireless signaling of information between the computer 12 and one or more auxiliary devices. For example, electronic equipment operated at one or more stations of interest in the work environment can be wirelessly linked to the computer 12, such as POS station(s) 18a, drive-thru station(s) 18b, etc. Similarly, sensor data can be provided to the computer 12, for example from equipment sensor(s) 20a, facility sensor(s) 20b, etc. Other information sources from which the computer 12 can base various decisions upon include authority figures associated with the work environment in question, such as corporate officers 22a, a store owner/operator 22b, a store manager 22c, a store assistant manager 22d, etc. In this regard, the authority FIG. 22 can also receive or view stored information from the computer 12, either directly or wirelessly (via the transmitter/receiver 14). Finally, in some embodiments, the computer 12 is electronically connected to one or more displays 24 at which various, desired information generated and/or stored by the computer 12 can be displayed.

The computer 12 is programmed to perform one or more operations relating to desired interface with the crew members 16. In a most basic form, the system 10 operates to play one or more pre-recorded audio support statements to one or more of the crew members 16 via the body-mounted audio support device worn by the crew member(s) 16 in question, with the pre-recorded audio statement facilitating or prompting a desired action by the crew member(s) 16. The timing and selection of a particular pre-recorded audio support statement is dictated by the computer 12 as described below. In some embodiments, the computer 12 is further programmed to generate the pre-recorded audio support statement and transmit the so-generated statement to the audio support device(s) worn by the crew member(s) 16 in question. Alternatively, the computer 12 is programmed to prompt one or more audio support devices to play a pre-recorded audio support statement stored in a memory of the device itself. As a point of reference, a "pre-recorded audio support statement" can be a complete sentence or sentences, one or more words, or one or more sounds that are formulated into a complete word or sentence via computerized speech synthesis. This feature is represented at 30 in FIG. 1. Where desired, the computer 12 can be further programmed to generate (or prompt playing of) supplemental non-statement audio (e.g., music).

Regardless, the pre-recorded audio support statements generated or prompted by the computer 12 can be based on various information and/or data, such as crew assignments 32, and crew response and verification 34. These and other informational items can be processed by a support analysis and implementation module 36 maintained or operated upon by the computer 12. The support statements can be sent just in time (JIT) and are selected based on production, crew/worker, facility, equipment and sales activities and status. The audio statements are determined by if-then calculations, condition algorithms and/or efficiency formulas or other automated means as performed by the system's computer 12. These may be refined as changes are determined to create improved conditions leading to increased profit. New statements are provided and/or initiated wirelessly to a body-mounted device 40 resident with a crew member/worker 16 and generally shown in FIG. 2. The crew member/worker 16 replies by issuing a select preprogrammed wireless response as described below. This response validates the communication and provides direction to the computer 12.

The formulation, parameters, and number of algorithms upon which the computer 12 is programmed to operate can assume a variety of forms and are a function of the needs and/or concerns of the work environment in which the system 10 is employed. For example, where the work environment is a fast food restaurant, possible algorithms can relate to prompting crew to make more of a particular food item based on an if-then analysis by the computer 12. Under these circumstances, one possible algorithm can entail if quarter pound hamburger sandwich orders exceeds a predetermined value (e.g., 10) during a predetermined time period (e.g., 4 minutes), more than a predetermined number of times in a predetermined window (e.g., 3 times in a 30-minute window), then the computer 12 prompts delivery of a pre-recorded audio statement that "over-rides" existing crew instructions and orders that more quarter pound hamburger sandwiches be made (e.g., "Make a complete flat or grill area of quarter pounders immediately."). Another possible algorithm can include if the current standard staffing of the fast food work environment normally utilized for a certain time period (e.g., time of day, day of week, time of year) and weather in combination with recorded sales occurring at point-of-sale counter units and drive-thru point-of-sale units is outside of the (high or low) forecast for the current standard staffing, then the computer 12 sends a pre-recorded audio statement to a manager relating to staffing (e.g., "Additional crew members should be added."). Yet another possible algorithm can include if responses for crew reaction times are determined as not meeting production times needed to satisfy customer within a predetermined time window, the computer 12 can operate to send up to three different pre-recorded audio statements: a first statement delivered to a store manager alerting the manager as to the problem and possibly naming the crew member(s) giving rise to the problem; a second statement delivered to the crew informing them of the shortcoming; and a third statement delivered to a selected crew member (e.g., an experienced crew member) to assist other crew members in completing a particular task.

As should be evident from the above, the operation formulas and algorithms operated upon by the computer 12 in prompting delivery of various pre-recorded audio statements can be extensive and varied. They may depend on work environment constraints such as equipment type(s), laws governing operation of the work environment (e.g., crew members must be of a certain age to perform certain tasks), crew quality and mix at the time, orders, available equipment (e.g., two or three grills are up to temperature), crew availability (e.g., in restroom), local product inventory, crew assignments, crew schedule assignment(s), historical performance/ability of each crew, etc.

Figure 2:
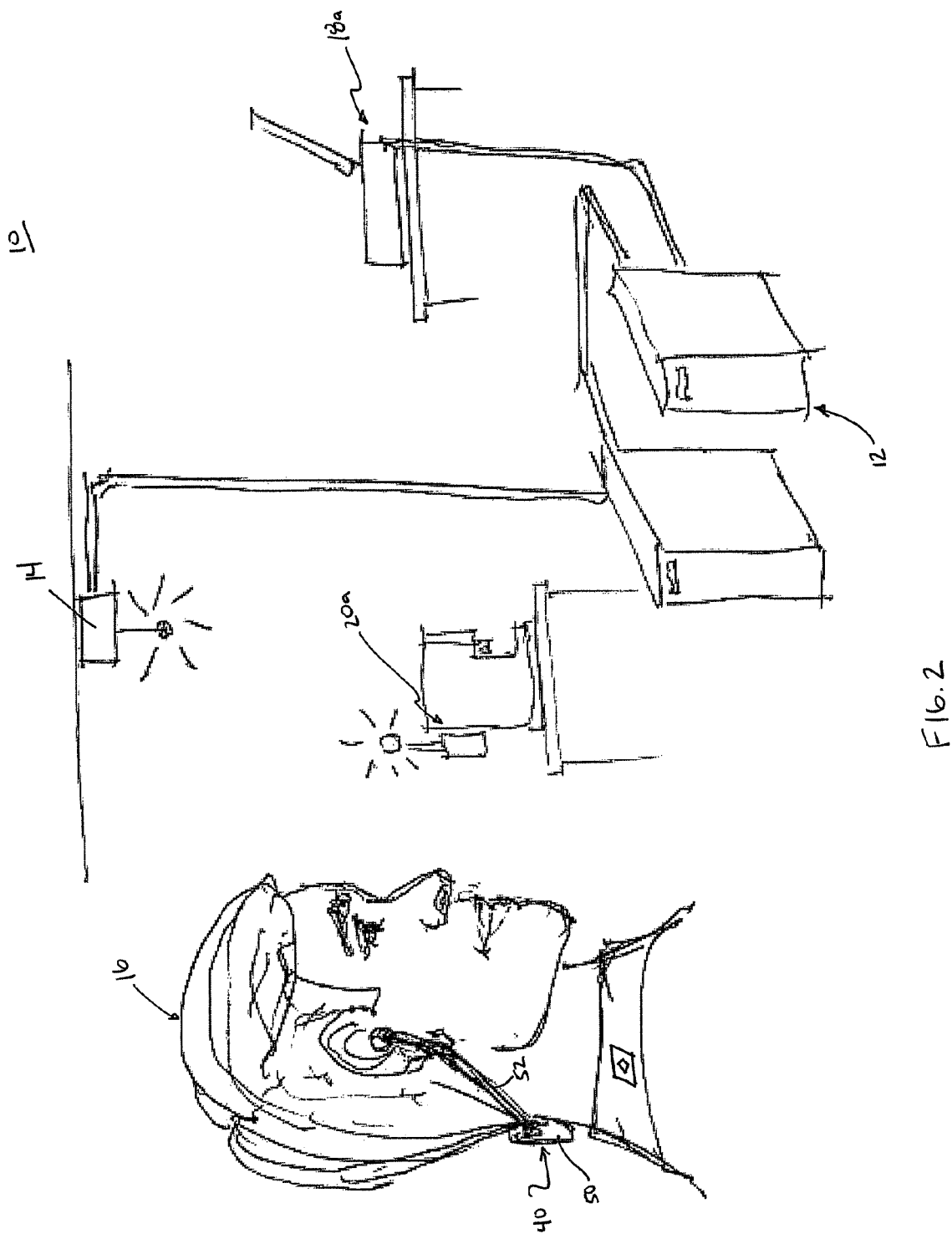
FIG. 2 is a diagram and illustration of one embodiment of a body-mounted device with integrated one-way wireless response button useful with the system of FIG. 1.

The body-mounted, audio support device 40 can assume a wide variety of forms. In one format, the device 40 is a conventional wireless headset (e.g., head mounted with speakers being placed in the wearer's ears). In other embodiments, the device 40 includes a base 50 and a pair of tubes (or other structure) 52 extending from the base 50 for delivery of audio to the worker's 42 ears. In some embodiments, the body-mounted device 40 is configured to be worn behind-the-head, with the base 50 maintaining a pair of speakers (not shown), the audio output from which are delivered to the worker's 16 ears via the tubes 52. Various configurations of acceptable body-mounted audio support devices are described in U.S. application Ser. No. 12/098,247, filed Apr. 4, 2008, entitled "Mobile Personal Audio Device" and the entire teachings of which are incorporated herein by reference. Regardless, and as further reflected in FIG. 2, the body-mounted audio support device 40 operates in response to instructions generated by the computer 12, and signaled via the wireless router 14. FIG. 2 further reflects the computer 12 receiving and acting upon information/data generated at other auxiliary devices, such as the POS register 18a and an equipment sensor 20a (e.g., fast food equipment).

In some embodiments of the present disclosure, the device 40 includes a pair of miniature speakers (typically sized and shaped common to ear bud speakers) placed into mounting areas within a single case. The wiring is entirely internal to the single-case connecting the speakers to an audio plug common for audio jack insertion or directly to an internal MP3, for example. The base 50 is optionally configured to accept the insertion of a separate MP3 device, and can include means to assist holding of the combined devices (i.e. surface for clipping, tab or capturing hook). Along these same lines, the base 50 is optionally configured to permit the user 16 to select audio feeds type such as Email, Internet radio, CNN, ESPN, books, music, etc. Optionally, a button on the base 50 permits the user 16 to change or stop the entertainment part of the audio. Another aspect provides a design control such as a valve or hole variable method to permit the user to tweak the appropriate balance between system audio and outside system sounds.

Typically both aspects and their single remote audio case use connected tubes with ear insertion and/or ear positioning terminals to direct the audio to the ear. The mounting means for either format of the embodiments may vary. Contemplated types include ear loops emanating from the tubes or ear positioning terminals, collar or collar area clipping, over-ear shapes of the tube, terminals, hooks, in-ear catch shapes, catches, clamps, head griping pressure from materials with 'memory' shape or internal or external tube shaping tension means (i.e. tensioned internal line, internal or external spring material, formed tube shaping snap on forms), stacked expendable mounting tape, or combinations of the above or with other means common to the industry for holding devices on or near the head.

In some embodiments, the base 50 maintains a controller (not shown) that controls operation of the speaker(s) (not shown) associated with the device 40, and programmed or electronically connected to a wireless linking component. The controller can be provided with or connected to a memory that stores the pre-recorded audio support statements referenced above, with the controller playing a particular pre-recorded audio support statement as prompted by the computer 12. Alternatively, the computer 12 can generate and transmit the desired or selected pre-recorded audio statements to the controller, with the controller in turn simply causing the speaker(s) to output the delivered statement(s).

Regardless of the controller (not shown) format, in some embodiments, the system 10 further includes a body-mounted signaling device 54 by which the worker 16 can wirelessly signal response(s) to the computer 12. With the one configuration of FIG. 2, the signaling device 54 is provided apart from the audio support device 40, and is carried by the worker 16. Alternatively, the signaling device 54 is integrated with the audio support device 40.

Figure 3:
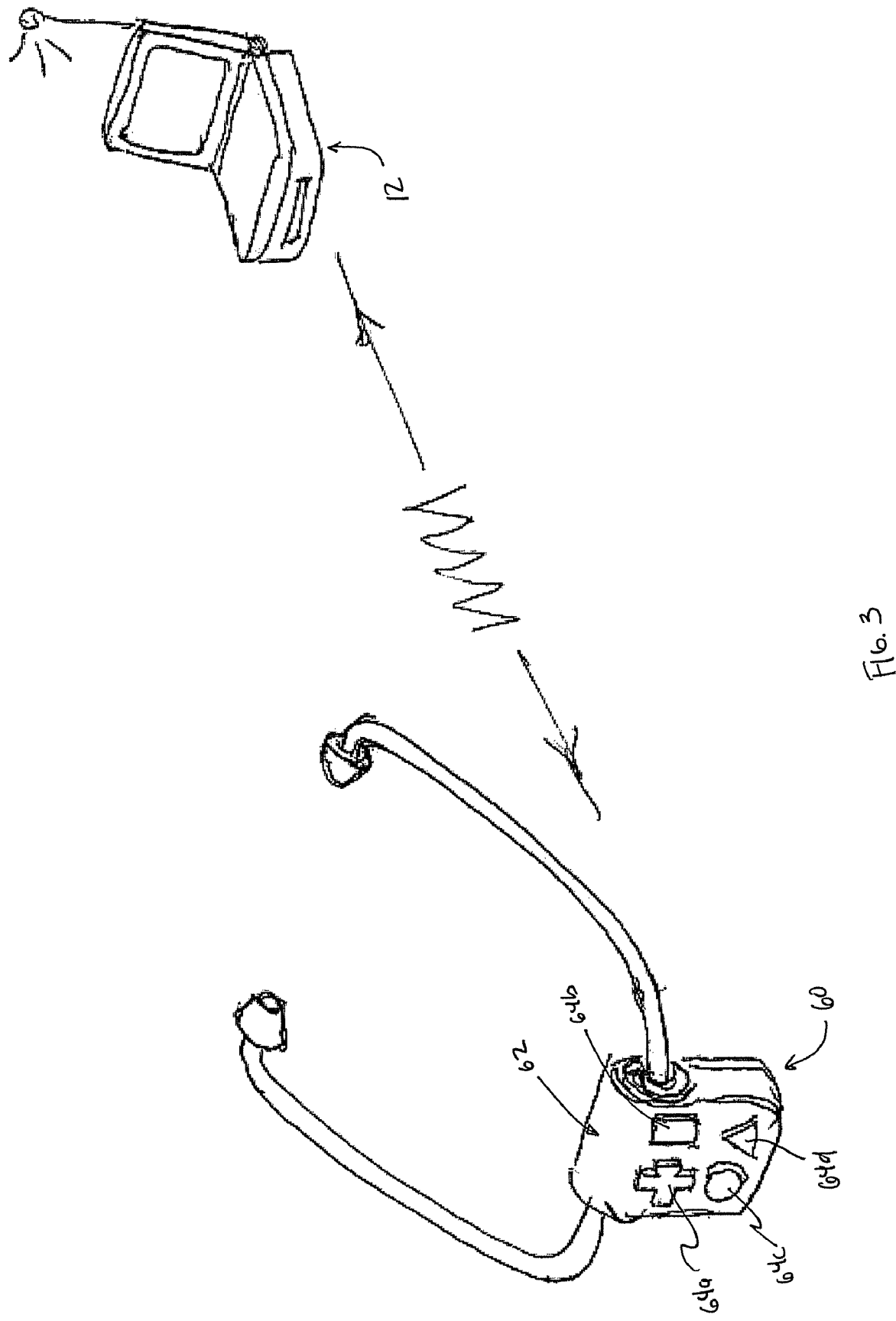
FIG. 3 is a diagram and illustration of one embodiment of a body-mounted device with a separate one-way wireless response button useful with the system of FIG. 1.

In some embodiments, the body-mounted audio support device 40 is configured to receive and deliver responses from the worker 16 in a simplified manner. For example, FIG. 3 illustrates an alternative body-mounted, audio support device 60 with signaling capabilities useful with the system 10 (FIG. 1), and wirelessly interfacing with the computer 12. The body-mounted device 60 is configured to generate assigned digital wireless responses. For example, the device 60 includes a base 62 maintaining one or more buttons 64a-64d (it being understood that in the view of the FIG. 3, the device 60 includes four of the buttons 64a-64d; in other embodiments, more or less than four buttons can be provided). A button 64a-64d press on the device 60 issues a short digital ID burst similar to a garage door opener to tell the PC/server 12 to acknowledge receipt of a message, validate the task completion or other response. Optionally, multiple button pressed during a timeframe (e.g., pressing the button 64a twice in succession) can provide an additional response meaning. This is especially helpful in a fast food work environment but is applicable to others.

Figure 4:
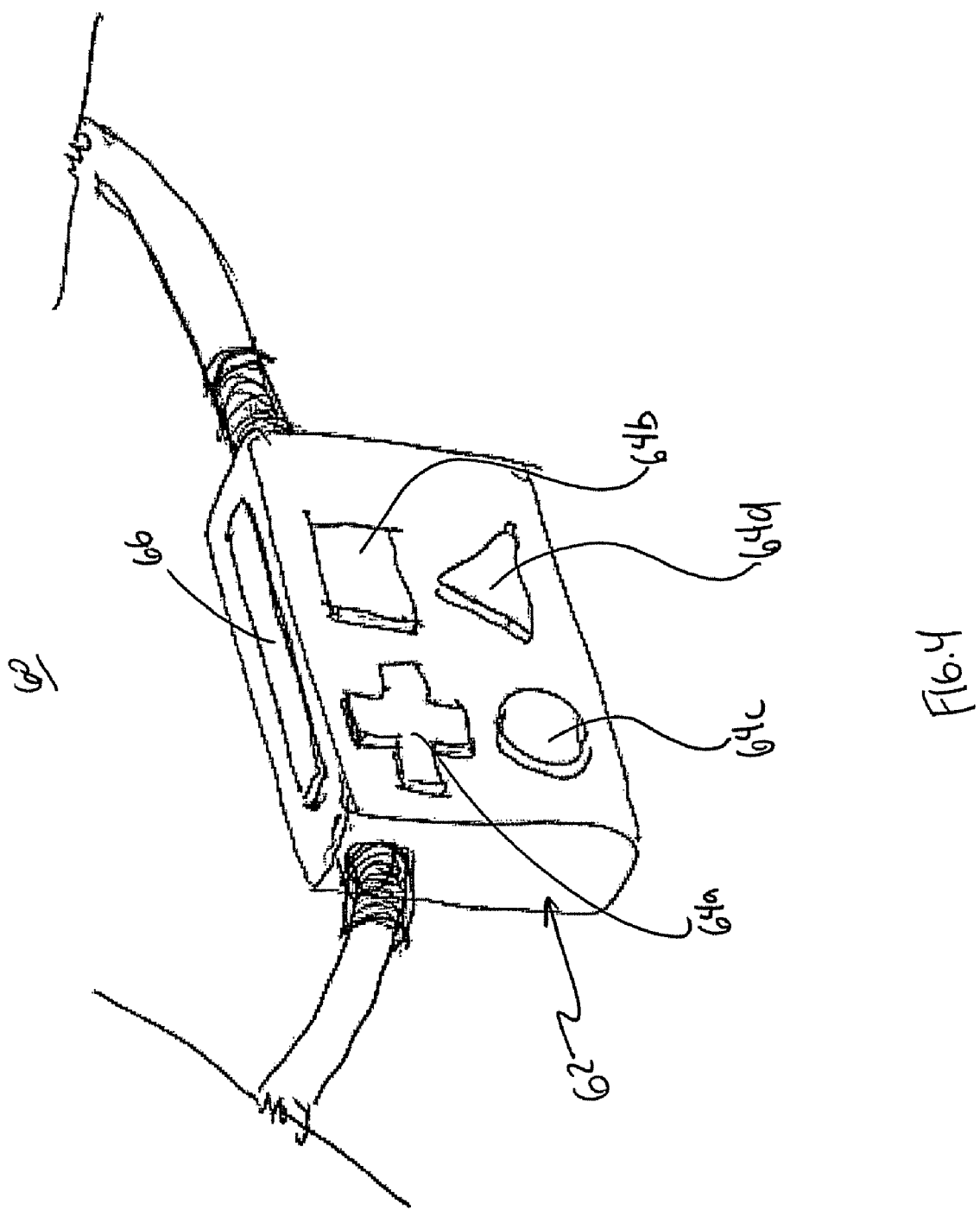
FIG. 4 is an illustration of one embodiment of a multiple response button body-mounted device useful with the system of FIG. 1.

In some, non-limiting examples, the first button 64a is dedicated to indicate that a message from the computer 12 was received by the worker 16 (FIG. 2); the second button 64b is dedicated for indicating that a task has been completed; the third button 64c is dedicated for requesting assistance in a performing a task; and the fourth button 64d is dedicated for requesting a change in the optional, supplemental audio (e.g., music). Further, the device 60 can include a switch 66 that allows the worker 16 (FIG. 2) to initiate or stop delivery of the optional, supplemental audio as shown in FIG. 4.

Another embodiment of a body-mounted audio support device 80 useful with the system 10 (FIG. 1) is shown in FIG. 5. The device 80 again includes a base 82 and a pair of tubes 84 extending from the base 82 for delivering audio from speakers (not shown) carried in the base 82 to the wearer's ears. In addition, the device 80 includes a microphone 86 that is electronically connected to a controller (not shown) carried in the base 82. With this construction, the system 10 can operate to switch the device 80 from audio in stereo to audio in mono and speech out in mono as directed by the user. This may happen when the microphone 86 of the device 80 is rotated to the mouth from the ear. It may also send a signal to the PC server 12 (FIG. 1) that speech input is coming and permit the computer 12 to prepare to forward, capture for speech to text analysis, or translate.

Returning to FIGS. 1 and 2, regardless of an exact format of the body-mounted, audio support device 40, the present disclosure permits the worker 16 to receive audio support statements generated and/or prompted by the PC Support 12, or the body-mounted device playing supplemental audio (e.g., music) as initiated the computer 12. The controller carried by the body-mounted audio support device 40 may be directed remotely to play a statement/instruction previously recorded on it. Alternately, the server/computer 12 may broadcast the statement to the body-mounted audio support device 40. Statements are sequential for some activities like store opening and closing and training. The system 10 may permit message skipping by qualified staff. Custom statements can be sent to staff if the system 10 sends messages from the central PC 12. This includes newsletters from headquarters placed into the store's PC or server 12 through the Internet. Alternately, the body-mounted devices 40 may only place new or custom messages when docked to a docking station (not shown).

In some embodiments, the system 10 is adapted to play music selected by the worker 16 at background level permitting communication by the Crew 16, and between crew 16 and customers. One way the disclosure provides this ambient sound is the devices 40 ability to permit access through additional opening to the tube 52 to outside of the system 10. Optionally, this may be adjustable by such means as a valve or hole adjustment. The background music of the Crew's 16 choosing provides additional incentive for responding to the system 10 requests and job retention.

In some embodiments, the computer 12 is programmed to select pre-recorded statements in the language of the worker 16 (FIG. 2). Optionally, the pre-recorded statements can be played in more than one language to help the Crew 42 learn new languages and terms.

In other embodiments, the computer 12 is programmed to forward a task (as a pre-recorded audio statement or instruction) to an available Crew 16 person via the body-mounted device 40 worn by the workers 16.

Expanding aspects for the system 10 and body-mounted, audio support devices may be components and process to permit the use of devices by more than one person. This includes such items as voice recognition, biometrics such as fingerprint ID at the device check in/out station and replaceable earpieces.

Following is an example of the system's 10 application in a fast food restaurant:

1 Hand Cleanliness: The system 10 may include ID sensors 20 for those wearing the body-mounted audio support device 40 for location monitoring. Should a water sensor 20 and/or a soap fill dispenser not be used when the Crew uses the restroom, a reminder audio statement would be sent or prompted by the computer 12. This would provide a cleaner and safer environment because of the system.

2 Crew Coordination Grill Area: The system can better respond to POS changes by providing JIT inventory of both frozen and cooked product. The computer 12 can be programmed to provide assistance (e.g., prompting the delivery of pre-recorded audio statements or instructions) when needed based on product preparation timing as evidenced by observed and analyzed response times 34. It can better float available Crew 16 to the most needed task like assembling and packaging to speed product to customers.

3 Store Manager Staffing: The system 10 can "observe" performance of the Crew 16 and sales. The computer 12 can be programmed to compare historical and weather related impact and make recommendations to the store manager or other authority FIG. 22 for increases and decreases of number of Crew 16 in advance of the need. Authority FIG. 22 can obtain recommendations from the computer 12 for Crew performance awards.

4 Owner/Operator Store Closing: The system 10 can provide overviews, graphs and charts of store and multiple store performance. The computer 12 can be programmed to provide assurance of proper and timely store opening and closing. The computer 12 can be programmed to verify the store management performance and decisions real-time. It can provide store operation statistics and financial results as they occur. It provides the Owner/Operator 22b with communication to management 22c, 22d and crew 16.

5 Corporate News: The store's corporate access provides full-time on-line input for such activities as communication and system upgrades, operation updates and corporate announcements via operation of the computer 12.

6 Training: The computer 12 can be programmed to deliver or prompt delivery of automated statements and performance ratings for new Crew and changing operational tasks provides a more full-time support system. The statements can be individualized based on the performance of the Crew or manager in training. Further, information stored in the computer 12 can be used as a reference for those coming back from a vacation or reemployment, as well as JIT training knowledge. The system 10 validates that training has occurred and been successful.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A system for supporting employees in a fast food restaurant work environment, the system comprising:
   a plurality of available portable interface units, each of the units adapted to be associated with a selected employee user in the work environment and including:
      a portable, body-mounted audio support device configured to be worn by a user and deliver audio from a speaker to a user's ear,
      a body-mounted signaling device configured to be worn by a user and to wirelessly transmit user information; and
   a computer programmed to:
      designate an assignment status to each of the available interface units, the assignment status being indicative of an in-use state of the interface unit and, for any interface unit designated to be in-use, task responsibilities and skill level of a user assigned to the interface unit,
      wirelessly interface with each of the audio support devices, including prompting the audio support device to play one or more pre-recorded audio statements,
      select a first pre-recorded audio statement and a second pre-recorded audio statement relating to a first task based upon a fast food restaurant operational requirement and information wirelessly received from at least one of the signaling devices, designate task completion requirements and minimum skill level for an employee performing the first task, identifying at least a first one of the available interface units to be prompted to play the first pre-recorded audio statement as a function of a comparison of the task completion requirements and minimum skill level with the task responsibilities and skill level, respectively, associated with the designated assignment status of each of the in-use interface units, identifying at least a second one of the available interface units to be prompted to play the second pre-recorded audio statement as a function of a comparison of the task completion requirements and minimum skill level with the task responsibilities and skill level, respectively, associated with the designated assignment status of each of the in-use interface units wherein the pre-recorded audio statements are generated by one of the computer and the corresponding audio support device.

2. The system of claim 1, wherein the signaling device is configured to generate and signal information indicative of a user response to a pre-recorded audio statement.

3. The system of claim 2, wherein the audio support device of each interface unit comprises a behind-the-head headset integrated with the corresponding signaling device for sending predetermined signals to the computer.

4. The system of claim 2, wherein the audio support device and the signaling device of each interface unit are separate body-mounted devices.

5. The system operation of claim 1, wherein the computer is further programmed to generate next statement decisions and initiate the playing of a particular prerecorded statement on selected ones of the support devices.

6. The system operation of claim 1, wherein the system is configured to prompt non-statement audio to play by the support devices in addition to the pre-recorded audio statements.

7. The system operation of claim 6, wherein the computer is programmed to ensure that the non-statement audio is not continued until the corresponding body-mounted audio support device user has responded to a pre-recorded audio statement.

8. The system operation of claim 6, wherein the non-statement audio is music selected by a wearer of the audio support device.

9. The system operation of claim 6, wherein the audio support device of each of the interface units is configured to provide user control over the non-statement audio.

10. The system operation of claim 1, wherein the audio support device of at least one of the interface units includes a button response system having differently shaped buttons with assigned message meanings.

11. The system of claim 1, wherein the pre-recorded audio statements are in more than one language.

12. The system of claim 1, further comprising:
a point-of-sale computing device electronically linked to the computer;
wherein the computer is programmed to prompt the audio support device to play at least one pre-recorded audio statement based upon information from the point-of-sale computing device.

13. The system of claim 1, further comprising:
at least one sensor located in the work environment and electronically linked to the computer;
wherein the computer is programmed to prompt the audio support device to play a particular pre-recorded audio statement in response to information received from the sensor.

14. The system of claim 13, wherein the at least one sensor includes:
a monitoring sensor of equipment within the work environment.

15. The system of claim 13, wherein the at least one sensor includes:
a door open and close sensor.

16. The system of claim 13, wherein the at least one sensor includes:
a fast food equipment sensor.

17. The system of claim 1, wherein the computer is programmed to prompt the audio support device of the first interface unit to play the first pre-recorded audio statement and to suppress prompting of the audio support device of the second interface unit to play the first pre-recorded audio statement based upon the designated assignment statuses of the first and second interface units.

18. The system of claim 1, wherein the computer is further programmed to designate a minimum age requirement for an employee performing the first task and the first pre-recorded audio statement includes an instruction to perform the first task, and further wherein the assignment status of any interface unit designated to be in-use includes an age of the user assigned to the corresponding interface unit, and even further wherein the computer is programmed to determine which of the available interface units will be prompted to play the first pre-recorded audio statement as a function of a comparison of the minimum age requirement with the age information associated with the designated assignment status of each of the in-use interface units.

19. The system of claim 1, wherein the plurality of interface units includes the first interface unit assigned to a first user, the second interface unit assigned to a second user, and a third interface unit assigned to a third user, wherein the computer is programmed to select a third pre-recorded audio statement relating to a second task based upon a fast food restaurant operational requirement, the first audio statement differing from the third statement and the first task differing from the second task, and further wherein the computer is programmed to prompt playing of the first audio statement by the first interface unit and not the third interface unit, and to prompt playing of the third audio statement by the third interface unit and not the first interface unit.

20. The system of claim 1, wherein the computer is further programmed to identify and prompt a plurality of the in-use interface units to play the first pre-recorded audio statement, and to identify and prompt only the second interface unit to play the second pre-recorded audio statement.

* * * * *